Figure 1:
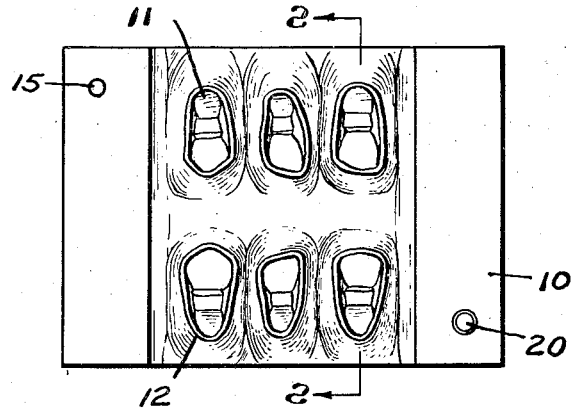

March 6, 1945. A. E. GIBSON, JR 2,370,623
METHOD OF MOLDING ARTICLES
Filed Sept. 29, 1942  2 Sheets-Sheet 1

INVENTOR
ALBERT E. GIBSON JR.
BY W. G. Sullivan
ATTORNEY

March 6, 1945. A. E. GIBSON, JR 2,370,623
METHOD OF MOLDING ARTICLES
Filed Sept. 29, 1942   2 Sheets-Sheet 2
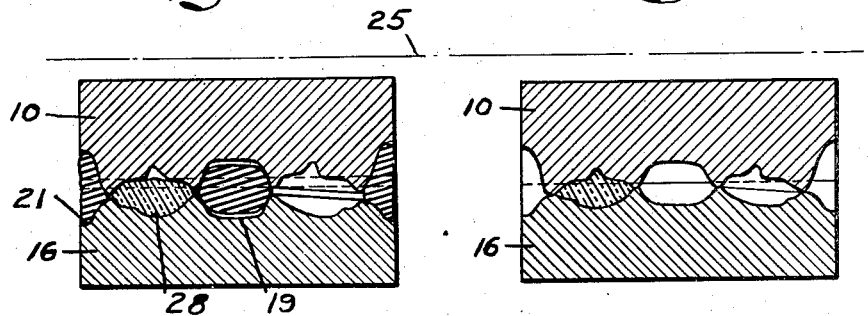
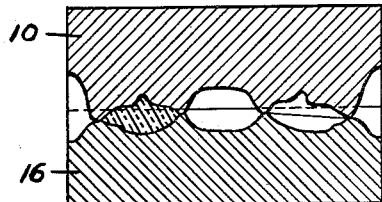
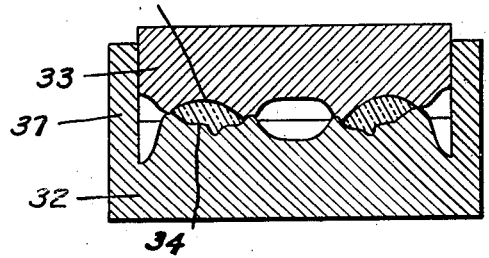
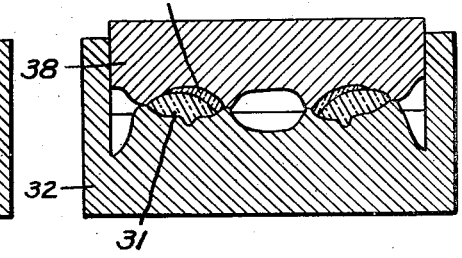
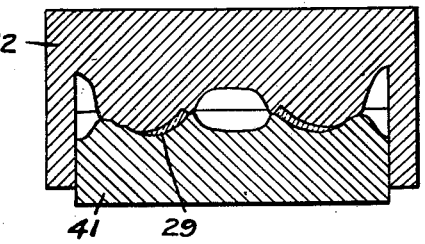
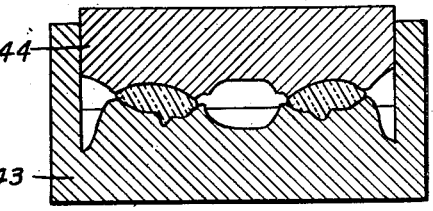
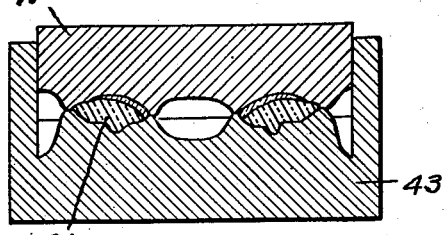
INVENTOR
ALBERT E. GIBSON JR.
BY W. G. Sullivan
ATTORNEY Patented Mar. 6, 1945

2,370,623

UNITED STATES PATENT OFFICE 2,370,623

METHOD OF MOLDING ARTICLES

Albert E. Gibson, Jr., Springfield, Pa., assignor to The Dentists' Supply Company of New York, New York, N. Y., a corporation of New York Application September 29, 1942, Serial No. 460,173

3 Claims. (Cl. 18—55.1)

The present invention relates to articles formed of plastic resins, and more particularly to an improved method of forming articles of thermo-setting resins.

It has been common practice to form articles of thermo-plastic resins by injection molding wherein the resin material is subjected to sufficient heat to render the same flowable, and is then injected into a mold under high pressure. However, this method is not practical for forming articles of thermo-setting resin, since it is a characteristic of the thermo-setting resins that they permanently harden at a polymerizing temperature, and they tend to harden at a flowable temperature. Also, when the thermo-setting resins are once heated to a polymerizing temperature they will permanently harden in the heating and charging cylinder of an injection molding machine, which renders this method impractical. For this reason, it has been common practice to mold thermosetting resins by compression wherein the resin material is introduced in powdered form between separable hard molding surfaces which are forced into contact under heat to mold the article. Due to the considerable difference in volume between the initially supplied thermo-setting material in powdered form and the material in final molded form, it has heretofore been proposed to mold an article formed of thermosetting resins by supplying and compacting the material in several stages due to the limited capacity of the mold part receiving the material relative to the total volume of material required.

I have provided an improved method of molding thermo-setting resins which largely eliminates the aforementioned disadvantages.

It is a primary object of my invention to provide an improved method of forming articles of thermo-setting resins, and wherein the resin material is compressed and molded in a novel manner.

Another object of my invention is to provide an improved method of molding articles from thermo-setting resins by compressing the resin material between nontelescoping hard molding surfaces, and wherein the entire amount of resin material required to form the article may be supplied at one time.

Another object of my invention is to provide an improved method of molding articles formed of thermo-setting resins, wherein the steps required in molding the article are reduced to a minimum.

According to the invention, a pair of separable mold parts having molding surfaces or pockets therein are adapted to be engaged and form a mold cavity therebetween. These mold parts are formed of a hard material, such as metal. A loading plate, formed of resilient material, such as rubber, has a perforation therethrough substantially conforming in contour to the periphery of the molding surfaces, and adapted to register with the molding surfaces of the mold parts. The loading plate is superposed on one of the mold parts, and in registry therewith, whereby the perforation forms a reservoir above the molding surface or pocket. Thermo-setting resin material in powdered form is then supplied to the mold pocket and loading plate perforation in an amount sufficient to form the article. The loading plate may be made sufficiently thick at the perforation so that when resin material fills the perforation, or is substantially flush with the plate surface at the perforation, that the necessary amount of resin material for forming the article is provided. Thus, the loading plate in addition to other functions may act as a measuring device.

The second mold part is then placed on the loading plate and the upper and lower mold parts will be substantially spaced by the loading plate. Relatively heavy pressure is then applied and the mold parts are forced towards each other until they are in slightly spaced relation, and the material is packed into the form of a hard pill. The pill will have a thickness slightly in excess of the thickness of the finished article. The pressure required to compact the material into pill form may be substantially reduced if heat is applied during the forming operation, but the temperature must be lower than the curing temperature of the material since otherwise the material will tend to permanently harden. The loading plate is then removed, and the mold parts reassembled. Pressure is then again applied and the material is heated to polymerizing or curing temperature whereupon the mold parts are brought into engagement to completely mold and permanently harden the material. The process described relates to forming the article entirely from the same material.

If it is desired to form a blended article or one comprising thermo-setting resin materials having different characteristics, such as an article wherein one portion is relatively opaque and another portion is relatively translucent, a three or four piece mold may be used. For example, in forming an artificial tooth, the body portion may be first formed between first and second separable mold parts in cooperation with the loading plate, as previously described. The body portion will then be in the form of a hard pill which is not permanently hardened or polymerized. The second mold part is removed and the body portion remains in the first mold part. Any loose material employed to form the body is removed from the pill, the first mold part and the loading plate. The loading plate is then superposed on or brought into registry with the mold part containing the body portion, and enamel forming thermo-setting resin material is placed in the perforation or reservoir in the loading plate in sufficient amount to complete the tooth.

A third mold part having a molding surface and pocket therein adapted to shape the labial surface of the enamel is then placed on the loading plate and pressure is applied until the mold parts are in slightly spaced relation. As previously pointed out, the material may be heated during this operation to a point below the curing or polymerizing temperature of the enamel material. The loading plate is then removed, and any excess or loose enamel forming material is brushed from the mold parts and tooth. The first and third mold parts are then re-assembled and pressure is applied while the material is heated to the permanent hardening or polymerizing temperature of the tooth material whereupon the mold parts will be brought into engagement to completely form and permanently harden the tooth.

The blended article or tooth may also be formed by a four-part mold wherein one pair of mold parts shape the body portion and another pair of mold parts shape the enamel portion. The body portion is retained in one mold part and the enamel portion in another mold part, and these two mold parts are assembled, and pressure is applied, while the material is heated to curing temperature to unite the body portion and enamel portion, and complete the tooth. In this instance, either the body or enamel portion may be initially molded with a slight excess thickness, and if heat is applied to the portion having such excess thickness to aid in shaping the same, it will be at a temperature below the curing temperature of the material. Thus, when the mold parts are assembled for the final molding step to complete the tooth, they will be in slightly spaced relation.

Figure 2:
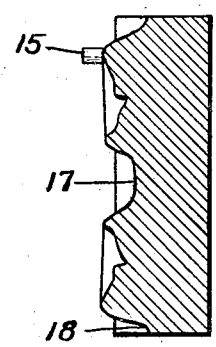
Figure 3:
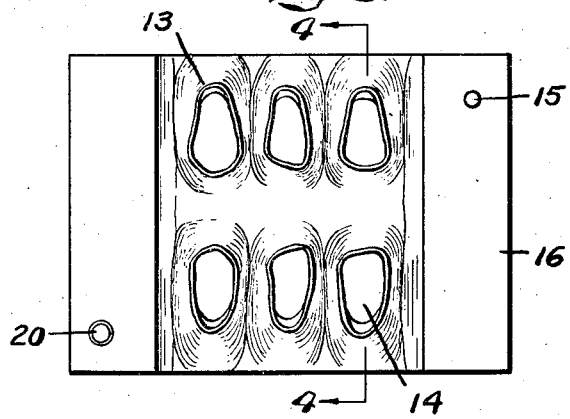
Figure 4:
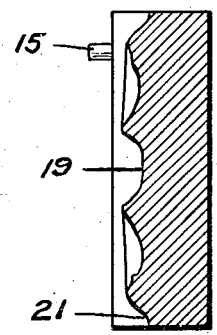
Figure 5:
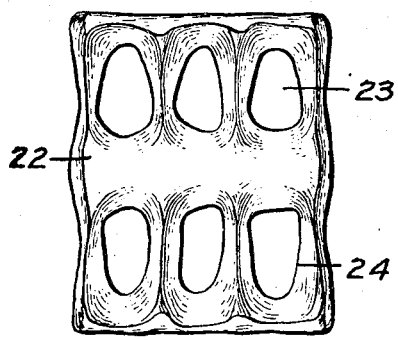
Figure 6:
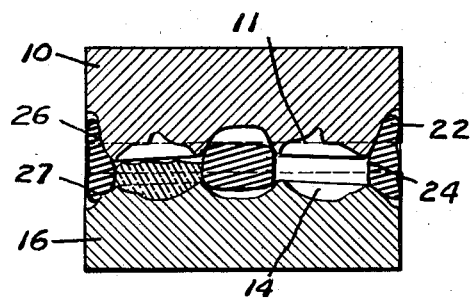

The drawings illustrate embodiments of the invention, and the views therein are as follows:

Figure 1 is a plan view of a mold part having pockets therein adapted to form the lingual portion of an artificial tooth, Figure 2 is a section taken along the line 2—2 of Figure 1, Figure 3 is a plan view of a mold part adapted to cooperate with the mold part of Figure 1, and having pockets therein adapted to form the labial portion of the tooth, Figure 4 is a section taken along the line 4—4 of Figure 3, Figure 5 is a plan view of a loading plate which I may employ in association with the mold parts illustrated in Figures 1 and 2, Figure 6 is a transverse sectional view showing the mold parts and loading plate in assembled relation and prior to applying pressure to the mold parts, Figure 7 is a view similar to Figure 6 wherein the mold parts are under pressure and in slightly spaced relation, Figure 8 is a transverse sectional view showing the mold parts of Figures 1 and 2 engaged, and the loading plate removed, Figure 9 is a transverse sectional view showing two parts of a three-part mold engaged to form the body portion of a blended tooth, Figure 10 is a transverse sectional view showing one of the mold parts of Figure 9 engaged with the third mold part to complete the molding of the blended tooth, Figure 11 is a transverse sectional view showing a pair of mold parts of a four-part mold engaged to form the enamel portion of a blended tooth, Figure 12 is a transverse sectional view showing a cooperating pair of mold parts of the four-part mold disposed in slightly spaced relation in forming the body portion of the blended tooth, and Figure 13 is a transverse sectional view showing one of the mold parts of Figure 11 engaged with one of the mold parts of Figure 12 to complete the molding of the blended tooth.

Referring now to the drawings, and particularly to Figure 1, I have indicated a lingual forming mold part generally at 10. This mold part is preferably formed of metal, and is of the general type employed in forming porcelain artificial teeth, except that the pockets 11 adapted to form the lingual portion of the tooth are relatively smaller since the shrinkage in permanently hardening a plastic resin tooth is negligible compared to a porcelain tooth. Each of the pockets are provided with an upstanding peripheral lip 12 adapted to engage cooperating lips 13 encircling the pockets 14 of mold part 16. The pockets 14 are adapted to form the labial portion of the tooth. The external walls of the pockets of both mold parts are inclined outwardly and downwardly, the walls of pockets 11 extending to the relatively flat surfaces 17 and 18, and the walls of pockets 14 extending to the surfaces 19 and 21.

The loading plate, generally indicated at 22, which is preferably formed of rubber or similar resilient material, is provided with perforations 23 substantially conforming in contour to the periphery of pockets 11 and 14 of the mold parts. The loading plate may be formed by using the mold parts 10 and 16 as patterns, and with the mold parts in sufficiently spaced relation to give a desired thickness to the perforations, and this thickness is determined by the amount of moldable material to be contained in the perforations. The loading plate perforations each have a vertical peripheral wall 24 forming a temporary reservoir for the material to be molded, an upper outwardly inclined peripheral wall 26 extending from wall 24 and conforming to an external wall of pocket 11, and a lower outwardly inclined wall 27 extending from wall 24 and conforming to the external wall of pocket 14.

The manner of molding an artificial tooth formed entirely of the same thermo-setting resin material will now be described. One of the mold parts, such as the mold part 16, is disposed with the pockets uppermost and the loading plate 22 is placed thereon, and in registry with the pockets 14. Thermo-setting plastic resin material is then placed in each of the pockets 14, and will extend upwardly into the perforations 22 which act as temporary reservoirs for material in excess of the amount accommodated by the pockets 14. As previously pointed out, the perforations 22 may act as a measuring device for determining the amount of resin material required for the tooth so that it is only necessary to supply material until it is substantially flush with the upper surface of the loading plate at the perforations. The mold part 10 is then placed on the loading plate, and pressure is applied to the mold parts to compress the resin material into the form of a hard pill, and bring the mold parts into slightly spaced relation, as indicated in Figure 7.

I have found that the pressure required may be substantially reduced if heat is concurrently applied to the material, but such heat should be less than the curing temperature of the resin material since otherwise the material will tend to permanently harden.

It should be noted that the perforation 23 at the wall 24 is slightly larger than the pockets 11 and 14 to avoid any danger of the plate material forming the wall 24 being pinched between the lips 12 and 13 of the mold parts, as pressure is applied, which would prevent the mold parts moving towards an engaged position.

The loading plate performs the dual function of acting as a temporary reservoir for the resin material and aiding in the compacting of the material since perforation wall 24 tends to move towards its associated mold pocket as pressure is applied to the mold parts. Inasmuch as the granular or powdered resin material in loose form has a greater volume than in molded form, and considerably in excess of the capacity of pocket 14, it will be appreciated that it would be necessary to form the pill 28 in several stages by successively compacting small amounts of the material if the loading plate were not employed.

The loading plate is then removed and the mold parts are re-assembled after loose material has been removed, and will be in slightly spaced relation due to the thickness of the pill 28. Pressure is then again applied to the mold parts, and the resin material is concurrently heated to polymerizing or permanent hardening temperature, and the mold parts are brought into engagement, as illustrated in Figure 8, to completely mold the tooth. The slight excess thickness of the pill 28 prior to the final molding operation insures that the material will be subjected to pressure during the hardening process. I preferably apply a lubricant to the mold pockets initially, such as zinc stearate, to prevent the molded tooth from sticking to the mold. It will be noted, by reference to Figure 7, that the bottom surface of the loading plate tends to rest on the substantially flat surfaces 19 and 21 of mold part 16, and prevent the perforation wall 24 from rocking away from the pocket, and insures that the wall 24 will be maintained in a position to exert a compressing action on the resin material as pressure is applied. The tooth is then removed from the mold, and any flash is trimmed, and I have found that it is not necessary to polish the tooth to give a desired finish if the surfaces of the mold pockets are polished. The line 25 indicates roughly the position of the top surface of mold part 10 before it is forced towards mold part 16. To insure that the mold parts 10 and 16 are maintained in proper registry, I provide pins 15 on each mold part adapted to be received in holes 20 of the other mold part.

Referring now to Figures 9 and 10, I have illustrated a three-piece mold employed in forming a blended artificial tooth, or one wherein the enamel portion 29 is relatively transparent, and the body portion 31 is relatively opaque.

The mold part 32 has pockets 34 therein adapted to form the lingual surface of the body portion, and the mold part 33 has pockets 36 therein adapted to form the labial surface of the body portion. The body portion 31 may be molded in the same manner as the tooth described in connection with Figures 1 to 8 inclusive, except that it is not permanently hardened at this stage, and in this instance, I may provide upstanding peripheral walls 37 adapted to telescope over mold part 33 to maintain the mold parts in proper registry. After the body portion 31 has been compressed, the mold part 33 is removed and the body portion 31 remains in the mold part 32. The loading plate 22 is then placed on mold part 32 and in registry with pockets 34, and thermo-setting enamel forming resin material is disposed in the perforation 23 of the loading plate. A third mold part 38 is then placed on the loading plate, and pressure and optionally heat is applied until the mold parts 32 and 38 are in slightly spaced relation. The loading plate is then removed and the mold parts 32 and 38 are re-assembled, and pressure is again applied while the enamel material and body material is heated to a polymerizing or permanent hardening temperature, and the mold parts become engaged. The enamel portion 29 will then be fused or bonded to the body portion 31. It should be noted that the body portion and enamel portion of the tooth are permanently hardened concurrently, or that the first formed portion is not permanently hardened prior to molding the other portion thereto. The molded tooth may then be removed from the mold, and the flash trimmed, as previously described.

Referring now to Figures 11 to 13 inclusive, I have illustrated a four-part mold which I may employ in forming a blended tooth of the type illustrated in Figure 10. In this instance, I employ a pair of mold parts 41 and 42 for forming the enamel portion 29 of the tooth, and a second pair of mold parts 43 and 44 for forming the body portion 31 of the tooth. Either the enamel portion or body portion may be first molded or compressed to pill form, as previously described.

It will be assumed that the body portion is first compressed to pill form by employing the mold parts 43 and 44. The enamel portion will be molded by employing the loading plate and applying pressure to the mold parts 41 and 42 until they are in slightly spaced relation so that the thickness of the enamel portion 29 is slightly in excess of the thickness in final form, and if heat is applied during this step the temperature will be held below the curing or permanent hardening temperature of the enamel material. The loading plate and mold part 42 are then removed and the enamel material remains in mold part 41. Mold part 44 is also removed and the body portion remains in mold part 43 and mold parts 41 and 43 are then assembled, and pressure is applied while the enamel material and body material is being heated to its polymerizing or permanent hardening temperature and the mold parts are brought into engagement, as illustrated in Figure 13. If desired, the enamel material may first be compressed to pill form, as previously described, and the body portion may be pre-molded with a slight excess thickness, as indicated in Figure 12. The body portion and enamel will then be completely molded and inter-fused by applying a permanent hardening heat and pressure until mold parts 41 and 43 are brought into engagement. Also, both the enamel and body portion may be pre-molded with a slight excess thickness, and then fused together and completely molded by subjecting the same to a permanent hardening temperature and pressure.

The loading plate may be formed of natural rubber, synthetic rubber, or any suitable material which is resilient or deformable under pressure, and which will not be injured by the temperatures to which the loading plate may be subjected.

Although I have described my invention in relation to thermo-setting resins, I contemplate that artificial teeth formed of porcelain may also be molded by the aforementioned process, whereby the porcelain is supplied to the mold pockets either as a powder or in the form of a dough. In this instance, the porcelain would be completely molded prior to removal from the mold, but would not be permanently hardened. However, prior to removing the molded porcelain tooth from the mold, I preferably heat the molded porcelain tooth sufficiently to biscuit the same so that it may be easily removed from the mold without injury. The tooth is then removed from the mold, and permanently hardened or fused by subjecting the same to a relatively high temperature.

When the tooth or article is formed entirely of the same material and the material permanently hardens at a temperature which will not affect the loading plate, it is not necessary to remove the loading plate before permanently hardening the tooth. However, I find it is desirable to remove the loading plate under these conditions to insure that all loose material is removed from the article or tooth, so that such material will not be incorporated in the finished article.

Also, although I have described my invention in connection with the forming of artificial teeth, it is understood that it is equally adaptable to forming various articles, and that the pocket or molding surface may be altered to conform to the shape of such other article, whereby the molding surface or portions thereof in at least one mold part may be elevated or in relief rather than being formed as a pocket or intaglio design.

Although I have shown and described embodiments of my invention, I contemplate that numerous and extensive departures may be made therefrom without departing from the spirit of my invention and the scope of the appended claims.

The invention is hereby claimed as follows:

1. The method of molding articles which comprises providing a first rigid mold part having a molding surface, superposing on said mold part a loading plate formed of relatively soft resilient material and having a perforation therein substantially conforming to the periphery of said molding surface, disposing compactable material adapted to permanently harden at a given temperature on said surface, and in said perforation, providing a second rigid mold part having a cooperating molding surface, superposing said second mold part on the loading plate with the molding surfaces in alignment with the perforation, subjecting the assembled mold parts and loading plate to pressure to force the mold parts toward each other and into slightly spaced relation to compact the material, separating the mold parts and removing the loading plate, re-assembling the mold parts, and then applying pressure while subjecting the material to a permanent hardening temperature until the mold parts are engaged and the article is completely molded and permanently hardened.

2. The method of molding articles which comprises providing a first rigid mold part having a pocket formed therein, superposing on said mold part a loading plate formed of relatively soft resilient material and having a perforation therein adapted to form an upward extension of the pocket, disposing compactable material adapted to be permanently hardened at a given temperature in said pocket and perforation, providing a second rigid mold part having a cooperating pocket therein, superposing said second mold part on the loading plate with the pockets in alignment, subjecting the assembled mold parts and loading plate to pressure until the material is compacted, and the mold parts are in slightly spaced relation, separating the mold parts and removing the loading plate, re-assembling the mold parts, and then applying pressure to the mold parts while the material is heated to a permanent hardening temperature, and the mold parts are brought into engagement to mold and permanently harden the article.

3. The method of forming articles from thermosetting resins which comprises the steps of providing a first rigid mold part having a molding surface, a second rigid mold part having a cooperating molding surface, and a loading plate formed of relatively soft resilient material having a perforation therein substantially conforming in peripheral contour to the molding surfaces, superposing the loading plate on the first mold part to align the perforation with the molding surface thereof, disposing thermo-setting resin material on the molding surface and in the perforation, superposing the second mold part on the loading plate with the molding surface thereof in alignment with the perforation, applying pressure to force the mold parts into slightly spaced relation, whereby the perforation walls substantially prevent escape of material laterally outwardly and exert pressure on the material laterally inwardly, separating the mold parts and removing the loading plate, removing any loose material from the mold parts and compacted material, re-assembling the mold parts, then exerting pressure on the mold parts while heating the material to a permanent hardening temperature to bring the mold parts into engagement and completely mold and permanently harden the article.

ALBERT E. GIBSON, Jr.